(12) United States Patent
Jeong et al.

(10) Patent No.: US 9,496,651 B2
(45) Date of Patent: Nov. 15, 2016

(54) HDMI CONNECTOR

(71) Applicant: Lattice Semiconductor Corporation, Portland, OR (US)

(72) Inventors: Youchul Jeong, Cupertino, CA (US); Jaemin Kim, Santa Clara, CA (US); Baegin Sung, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/636,971

(22) Filed: Mar. 3, 2015

(65) Prior Publication Data

US 2016/0261073 A1  Sep. 8, 2016

(51) Int. Cl.
| | |
|---|---|
| *H01R 13/64* | (2006.01) |
| *H01R 13/6461* | (2011.01) |
| *H04N 21/4363* | (2011.01) |
| *H01R 13/66* | (2006.01) |
| *H01R 24/60* | (2011.01) |
| *H01R 107/00* | (2006.01) |

(52) U.S. Cl.
CPC ........ *H01R 13/6461* (2013.01); *H01R 13/665* (2013.01); *H01R 24/60* (2013.01); *H04N 21/43635* (2013.01); *H01R 2107/00* (2013.01)

(58) Field of Classification Search
CPC .......................... H01R 12/724; H01R 13/6594
See application file for complete search history.

(56) References Cited

U.S. PATENT DOCUMENTS

| | | | | |
|---|---|---|---|---|
| 6,935,870 | B2* | 8/2005 | Kato | H01R 13/65807 439/108 |
| 6,986,681 | B2* | 1/2006 | Tsai | H01R 23/6873 439/607.36 |
| 7,077,668 | B2* | 7/2006 | Lapidot | H01R 13/6477 439/108 |
| 7,090,540 | B2* | 8/2006 | Masumoto | H01R 43/20 439/108 |
| 7,108,552 | B2* | 9/2006 | Niitsu | H01R 23/6873 439/607.35 |
| 7,270,570 | B1* | 9/2007 | Hamner | H01R 13/65802 439/541.5 |
| 7,303,410 | B2* | 12/2007 | Saito | H01R 12/712 439/108 |
| 7,311,556 | B2* | 12/2007 | Wan | H01R 12/722 439/607.32 |
| 7,344,412 | B2* | 3/2008 | Sato | H01R 12/712 439/607.28 |
| 7,435,107 | B2* | 10/2008 | Masumoto | H01R 12/725 439/79 |

(Continued)

*Primary Examiner* — Ross Gushi
(74) *Attorney, Agent, or Firm* — Fenwick & West LLP (57) ABSTRACT

In one embodiment, an HDMI connector includes a plurality of conductive paths. The plurality of conductive paths correspond to four channels, i.e., three differential data channels and one differential clock channel. Each channel includes three conductive paths, which correspond to a differential pair and a dedicated ground. Each conductive path has a contact on one end and a pin on the opposite end. The pins of the plurality of conductive paths are arranged to attach to corresponding surface mounting pads in at least two columns of contact points. For each channel, the pad for the dedicated ground is larger than the pads for the differential pair, thereby providing shielding between the differential pairs of different channels.

20 Claims, 7 Drawing Sheets

(56) References Cited

U.S. PATENT DOCUMENTS

| | | | | |
|---|---|---|---|---|
| 7,445,469 B2* | 11/2008 | Wu | H01R 13/41 | 439/79 |
| 7,448,884 B2* | 11/2008 | Kato | H01R 23/6873 | 439/108 |
| 7,473,136 B2* | 1/2009 | Hu | H01R 12/716 | 439/541.5 |
| 7,497,704 B2* | 3/2009 | Saito | H01R 13/65802 | 439/108 |
| 7,575,454 B1* | 8/2009 | Aoki | H01R 13/641 | 439/188 |
| 7,578,700 B2* | 8/2009 | Xiong | H01R 13/65802 | 439/606 |
| 7,625,234 B1* | 12/2009 | Lee | H01R 12/725 | 439/607.07 |
| 7,632,111 B2* | 12/2009 | Xiong | H01R 13/6461 | 439/660 |
| 7,674,118 B2* | 3/2010 | He | H01R 24/60 | 439/108 |
| 7,686,646 B2* | 3/2010 | Lee | H01R 12/7047 | 439/567 |
| 7,727,027 B2* | 6/2010 | Chiang | H01R 12/725 | 439/218 |
| 7,748,997 B2* | 7/2010 | Hamner | H01R 12/712 | 439/607.01 |
| 7,758,380 B2* | 7/2010 | Wang | H01R 27/02 | 439/541.5 |
| 7,762,840 B2* | 7/2010 | Hamner | H01R 13/65802 | 439/541.5 |
| 7,824,220 B2* | 11/2010 | Chen | H01R 13/6477 | 439/607.35 |
| 7,845,961 B2* | 12/2010 | Zhu | H01R 13/65802 | 439/108 |
| 7,857,665 B2* | 12/2010 | Xiong | H01R 12/712 | 439/660 |
| 7,922,533 B2* | 4/2011 | Wang | H01R 27/02 | 439/541.5 |
| 8,011,947 B2* | 9/2011 | Lai | H01R 13/6272 | 439/358 |
| 8,011,969 B2* | 9/2011 | Wang | H01R 13/65802 | 439/607.35 |
| 8,016,601 B2* | 9/2011 | Masumoto | H01R 13/447 | 439/147 |
| 8,016,620 B1* | 9/2011 | Chiu | H01R 13/502 | 439/660 |
| 8,025,532 B2* | 9/2011 | Nagata | H01R 13/506 | 439/607.4 |
| 8,070,515 B2* | 12/2011 | Nagata | H01R 12/712 | 439/607.13 |
| 8,079,874 B2* | 12/2011 | Lee | H01R 13/62 | 439/607.32 |
| 8,096,834 B2* | 1/2012 | Lai | H01R 13/65802 | 439/607.28 |
| 8,137,131 B2* | 3/2012 | Wang | H01R 12/707 | 439/570 |
| 8,142,209 B2* | 3/2012 | Zhu | H01R 13/65802 | 439/108 |
| 8,172,620 B2* | 5/2012 | Su | H01R 13/42 | 439/607.01 |
| 8,206,177 B2* | 6/2012 | Chang | H01R 13/502 | 439/607.35 |
| 8,241,063 B2* | 8/2012 | Nagata | H01R 12/724 | 439/345 |
| 8,262,414 B1* | 9/2012 | Li | H01R 13/6273 | 439/607.35 |
| 8,298,016 B2* | 10/2012 | Lai | H01R 13/6596 | 439/607.28 |
| 8,357,009 B2* | 1/2013 | Vrenna | H01R 12/58 | 439/541.5 |
| 8,419,480 B2* | 4/2013 | Yu | H01R 13/6581 | 439/660 |
| 8,506,332 B2* | 8/2013 | Sommers | H01R 12/725 | 439/607.32 |
| 8,535,097 B2* | 9/2013 | Yen | H01R 12/724 | 439/607.27 |
| 8,591,258 B2* | 11/2013 | Xiao | H01R 12/724 | 439/541.5 |
| 8,668,527 B2* | 3/2014 | Zhang | H01R 12/724 | 439/660 |
| 8,702,454 B2* | 4/2014 | Hamada | H01R 13/04 | 439/733.1 |
| 8,708,750 B2* | 4/2014 | Ho | H01R 27/02 | 439/639 |
| 8,724,343 B2* | 5/2014 | Feldstein | H05K 9/0058 | 361/616 |
| 8,790,138 B2* | 7/2014 | Wang | H01R 27/02 | 439/607.4 |
| 8,848,387 B2* | 9/2014 | Nagata | H01R 13/6594 | 361/767 |
| 8,851,930 B2* | 10/2014 | Peng | H05K 1/0248 | 439/660 |
| 8,854,835 B2* | 10/2014 | Feldstein | H01R 12/724 | 174/351 |
| 8,864,501 B2* | 10/2014 | Lin | H01R 13/65807 | 439/607.4 |
| 8,870,581 B2* | 10/2014 | Chang | H01R 13/648 | 439/96 |
| 8,882,540 B2* | 11/2014 | Yen | H01R 27/00 | 439/489 |
| 8,894,443 B2* | 11/2014 | Sommers | H01R 12/725 | 439/607.32 |
| 8,932,081 B2* | 1/2015 | Kamarauskas | H01R 13/41 | 439/607.35 |
| 8,951,053 B2* | 2/2015 | Ho | H01R 27/00 | 439/159 |
| 8,961,221 B2* | 2/2015 | Chang | H01R 13/65802 | 439/541.5 |
| 9,011,178 B2* | 4/2015 | Hori | H01R 13/6581 | 29/842 |
| 9,124,051 B2* | 9/2015 | Tanaka | H01R 24/76 | |
| 9,136,623 B2* | 9/2015 | Hamada | H01R 12/724 | |
| 9,136,649 B2* | 9/2015 | Shih | H01R 13/658 | |
| 9,190,783 B2* | 11/2015 | Chang | H01R 12/7052 | |
| 2002/0123254 A1* | 9/2002 | Kato | H01R 13/65807 | 439/108 |
| 2005/0118876 A1* | 6/2005 | Niitsu | H01R 23/6873 | 439/626 |
| 2005/0186843 A1* | 8/2005 | Tsai | H01R 23/6873 | 439/607.36 |
| 2005/0272286 A1* | 12/2005 | Lapidot | H01R 13/6477 | 439/108 |
| 2007/0026732 A1* | 2/2007 | Zhang | H01R 13/6471 | 439/581 |
| 2007/0054553 A1* | 3/2007 | Nishio | H01R 13/64 | 439/607.55 |
| 2007/0066115 A1* | 3/2007 | Saito | H01R 13/65802 | 439/260 |
| 2007/0099512 A1* | 5/2007 | Sato | H01R 23/688 | 439/637 |
| 2007/0197064 A1* | 8/2007 | Masumoto | H01R 12/725 | 439/108 |
| 2008/0293301 A1* | 11/2008 | Hamner | H01R 23/6873 | 439/607.01 |
| 2008/0305683 A1* | 12/2008 | Li | H01R 13/6275 | 439/607.01 |
| 2009/0017683 A1* | 1/2009 | Lin | H01R 4/2404 | 439/607.17 |
| 2009/0023338 A1* | 1/2009 | He | H01R 43/24 | 439/607.01 |
| 2009/0130873 A1* | 5/2009 | He | H01R 13/6477 | 439/108 |
| 2009/0186528 A1* | 7/2009 | Chen | H01R 13/6477 | 439/660 |
| 2009/0203261 A1* | 8/2009 | Ikegami | H01R 12/592 | 439/628 |
| 2009/0305555 A1* | 12/2009 | Wang | H01R 13/502 | 439/541.5 |
| 2010/0093208 A1* | 4/2010 | Hamner | H01R 13/65802 | 439/541.5 |

(56) References Cited

U.S. PATENT DOCUMENTS

| | | | |
|---|---|---|---|
| 2010/0124829 A1* | 5/2010 | He | H01R 12/712 439/76.1 |
| 2010/0173524 A1* | 7/2010 | Zhu | H01R 13/65802 439/607.01 |
| 2010/0178794 A1* | 7/2010 | Hsu | H01R 9/031 439/391 |
| 2010/0261384 A1* | 10/2010 | Zhang | H01R 13/65802 439/607.01 |
| 2010/0317229 A1* | 12/2010 | Chen | H01R 27/02 439/607.23 |
| 2011/0034079 A1* | 2/2011 | Nagata | H01R 13/506 439/607.01 |
| 2011/0039447 A1* | 2/2011 | Lai | H01R 13/65802 439/527 |
| 2011/0059656 A1* | 3/2011 | Tsai | H01R 43/16 439/660 |
| 2011/0097933 A1* | 4/2011 | Sommers | H01R 12/707 439/607.34 |
| 2011/0111608 A1* | 5/2011 | Chen | H01R 12/724 439/78 |
| 2011/0201215 A1* | 8/2011 | Matsubara | H01R 13/6597 439/55 |
| 2011/0281464 A1* | 11/2011 | Hou | H01R 13/6593 439/607.55 |
| 2011/0281465 A1* | 11/2011 | Hou | H01R 13/6581 439/607.55 |
| 2012/0122348 A1* | 5/2012 | Cho | H01R 31/06 439/660 |
| 2012/0225583 A1* | 9/2012 | Kamarauskas | H01R 13/41 439/607.01 |
| 2012/0231675 A1* | 9/2012 | Zhang | H01R 13/6594 439/682 |
| 2013/0059460 A1* | 3/2013 | Sasame | H01R 24/60 439/345 |
| 2013/0090019 A1* | 4/2013 | Su | H01R 27/02 439/660 |
| 2013/0130546 A1* | 5/2013 | Wu | H01R 13/40 439/604 |
| 2013/0210271 A1* | 8/2013 | Chang | H01R 27/02 439/535 |
| 2013/0323944 A1* | 12/2013 | Hamada | H01R 12/724 439/65 |
| 2013/0344739 A1* | 12/2013 | Shih | H01R 13/658 439/607.28 |
| 2015/0044906 A1* | 2/2015 | Tian | H01R 13/6463 439/587 |
| 2015/0044911 A1* | 2/2015 | Wu | H01R 43/20 439/620.22 |
| 2015/0064969 A1* | 3/2015 | Kao | H01R 13/6582 439/607.28 |
| 2015/0087165 A1* | 3/2015 | Yu | H01R 12/724 439/78 |
| 2015/0222065 A1* | 8/2015 | Toba | H01R 29/00 439/620.21 |
| 2015/0333447 A1* | 11/2015 | Bai | H01R 13/64 439/607.54 |
| 2015/0333456 A1* | 11/2015 | Toba | H01R 13/6585 439/620.22 |
| 2015/0357775 A1* | 12/2015 | Yu | H01R 13/6582 439/218 |
| 2015/0364864 A1* | 12/2015 | Wang | H01R 13/629 439/607.01 |

* cited by examiner

FIG. 1

Top view
FIG. 2A

Side view
FIG. 2C

Front view
FIG. 2B

HDMI CONNECTOR

BACKGROUND OF THE INVENTION

1. Field of the Invention

This disclosure relates generally to HDMI connectors, and particular to an HDMI connector that reduces crosstalk between different channels to support higher data rates.

2. Description of the Related Art

High Definition Multimedia Interface (HDMI) is designed to transmit digital audiovisual signals from a source device to a sink device, usually for high-definition content such as 1080p video at 60 Hz. In order to take advantage of high resolution content, the physical HDMI connectors connecting two devices should support the full data rate of the content to be transmitted. As the need for supporting content of higher definition (e.g., 4k resolution content) arises, the ability of existing HDMI connectors to support these higher data rates has been limited by the crosstalk between different channels within an HDMI link. In addition to supporting these data rates, HDMI connectors generally must comply with the HDMI specification, preferably with backwards compatibility.

One approach is to compress the higher resolution content in order to meet the lower data rates that can be supported by existing HDMI connectors. However, this can lead to performance and other problems.

Thus, there is a need for HDMI connectors to support higher data rates.

SUMMARY

Embodiments of the present invention overcome the limitations of the prior art by arranging the pins of an HDMI connector to attach to the corresponding pads on a printed circuit board in at least two columns of contact points, preferably while maintaining the HDMI connector's backwards compatibility with HDMI specification v 1.4. These arrangements can be used to increase the distances between pins located in different columns, thereby reducing the crosstalk between different channels within an HDMI link.

In one embodiment, an HDMI connector includes a plurality of conductive paths (e.g., wires or leads). The plurality of conductive paths correspond to four channels, e.g., three differential data channels and one differential clock channel as specified by the HDMI specification. Each channel includes three conductive paths, which correspond to a differential pair and a dedicated ground for that channel. Each conductive path has a contact on one end and a pin on the opposite end. The contacts are the contacts for the HDMI connector. That is, the contacts make electrical connection to counterpart contacts on another connector, when the two HDMI connectors are connected. The pins are arranged to attach to corresponding surface mounting pads in a pad pattern that includes at least two columns of contact points. In some embodiments, for each channel, the pad for the dedicated ground is larger than the pads for the differential pair and/or the pad for the dedicated ground is shaped and positioned to provide shielding between the differential pairs of different channels.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
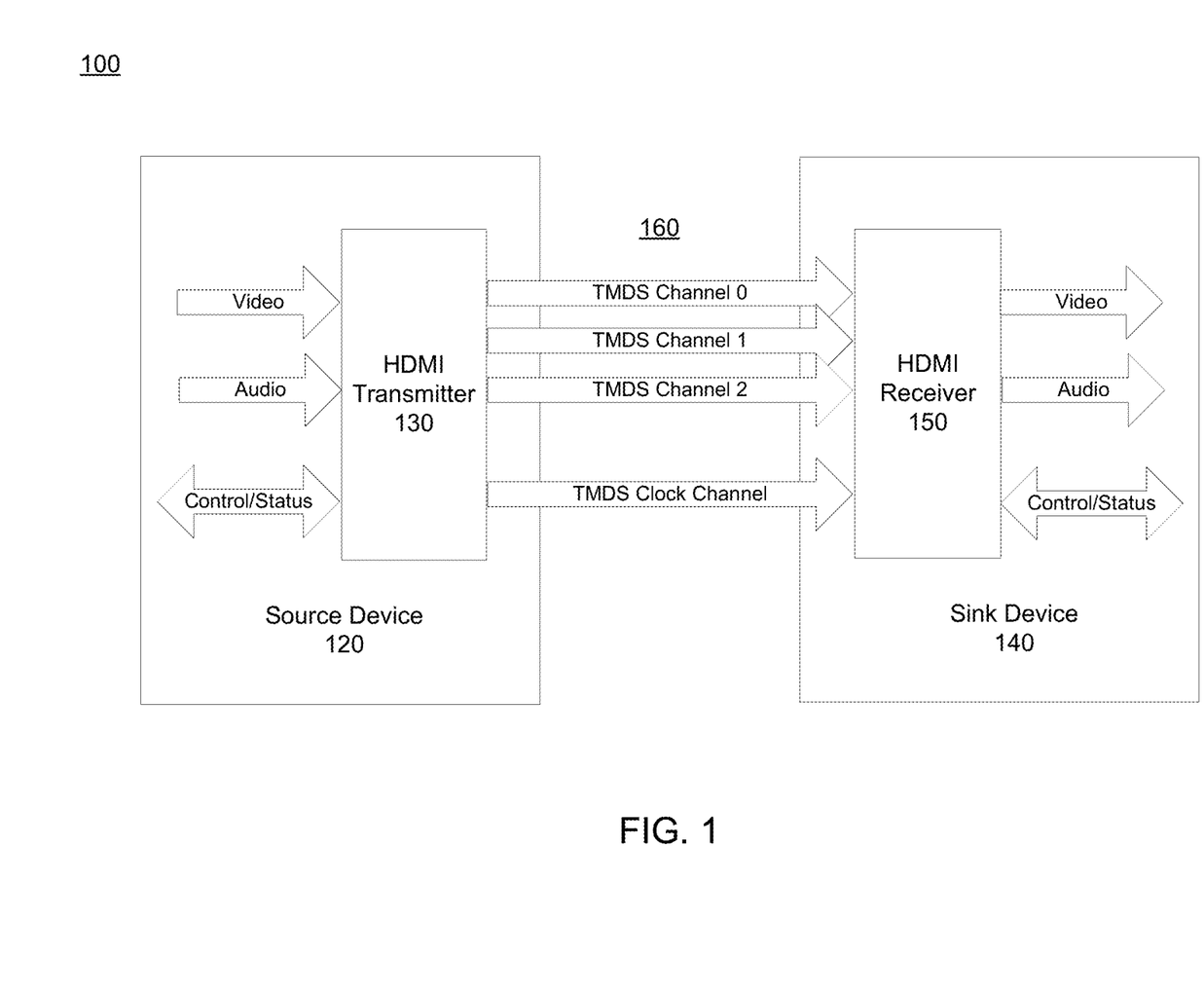
FIG. 1 is a block diagram of a system including an HDMI link.

FIG. 1 is a block diagram of a system including an HDMI link. The system 100 includes a source device 120, a sink device 140, and the HDMI link 160. The source device includes an HDMI transmitter 130 that processes audio, video, and other control/status signals for transmission via the HDMI link 160. The sink device 140 includes an HDMI receiver 150 that receives the audio, video, and other control/status signals from the HDMI link 160 and processes those signals for retransmission or display. The HDMI link 160 includes four TMDS (transition-minimized differential signaling) channels: TMDS data channel 0, TMDS data channel 1, TMDS data channel 2, and a TMDS clock channel.

Each of the four channels includes three conductors: a differential pair and a dedicated ground. The TMDS data channel 0 includes the differential pair D0+ and D0− and the dedicated ground D0_G. The TMDS data channel 1 includes the differential pair D1+ and D1− and the dedicated ground D1_G. The TMDS data channel 2 includes the differential pair D2+ and D2− and the dedicated ground D2_G. The TMDS clock channel includes the differential pair CK+ and CK− and the dedicated ground CK_G. Audio, video and auxiliary control/status data is transmitted over the three TMDS data channels. Each differential pair of the TMDS data channels forms a logical communication channel that carry multimedia data streams. A clock signal is transmitted on the TMDS clock channel and is used by the HDMI receiver 150 as a frequency reference for data recovery on the three TMDS data channels.

TMDS (transition-minimized differential signaling) is a differential signaling technology designed to transmit highspeed serial data that meets the requirements of current HDMI and earlier DVI specifications. The use of differential signaling is helpful to reduce the crosstalk between different channels.

The TMDS channels are typically implemented by an HDMI cable with HDMI plugs at each end. The HDMI plugs typically connect to corresponding HDMI receptacles on the source and sink pieces of equipment. As future HDMI specifications require higher data rates to support higher data rate content, existing HDMI connectors may have too much crosstalk to support the higher data rates. The HDMI connector designs described herein reduce the crosstalk to allow higher data rate content to be transmitted. In designing for the support of higher data transmission rate, it is preferred that the new HDMI connectors be backwards compatible with earlier HDMI specifications, including for example HDMI specification v 1.4.

Figure 2A:
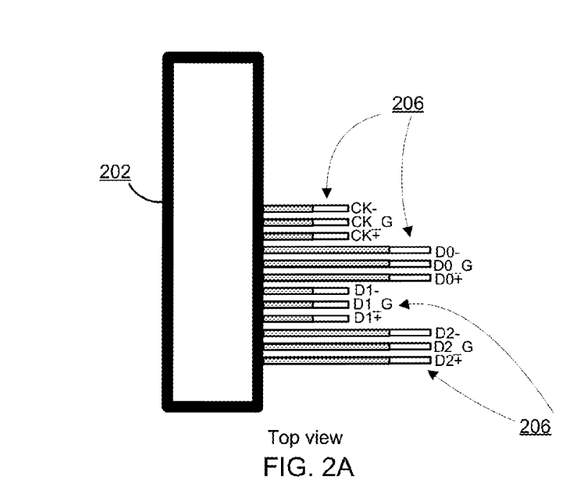
FIGS. 2A, 2B, and 2C are top, front and side views of one embodiment of an HDMI receptacle according to the present invention.
Figure 2B:
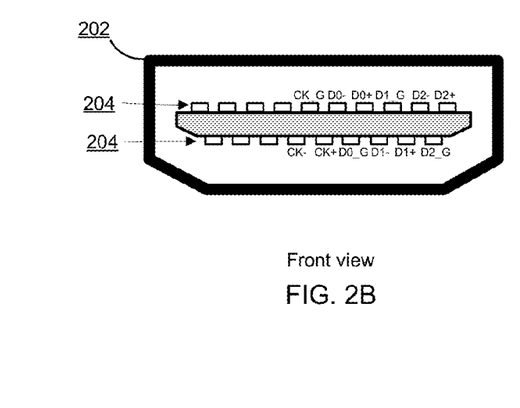
Figure 2C:
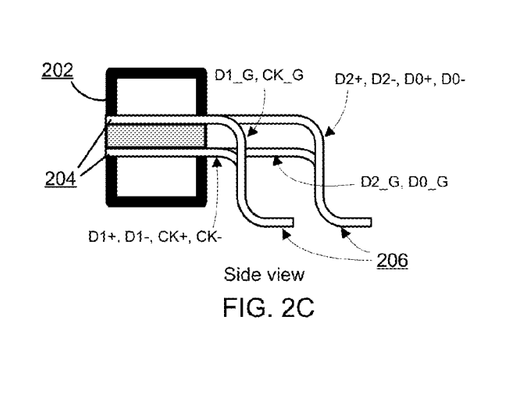

FIGS. 2A, 2B, and 2C are top, front and side views of one embodiment of an HDMI receptacle according to the present invention. An HDMI Type A receptacle is shown in the figures as an example. FIG. 2A shows a top view of the HDMI receptacle, which includes a receptacle housing 202. Leads for the three data channels and the clock channel extend from the receptacle housing. The leads for the data channel 2 are labeled D2+, D2_G, and D2−, the leads for the data channel 1 are D1+, D1_G, and D1−, the leads for the data channel 0 are D0+, D0_G, and D0−, and the leads for the clock channel are CK+, CK_G, and CK−. Pins 206 are formed on one end of the leads. The pins are used to attach to surface mounting pads. The pins 206 are arranged to form two or more columns. In this example, the pins for data channel 1 and the clock channel are located in the left column, while the pins for data channel 2 and data channel 0 are located in the right column.

FIG. 2B shows a front view of the HDMI receptacle. The contacts 204 for making electrical connections with another connector (e.g., a plug of an HDMI cable) are visible in this view. The contacts are arranged in two rows. From right to left, the top row includes the contacts for D2+, D2−, D1_G, D0+, D0−, and CK_G. The bottom row includes the contacts for D2_G, D1+, D1−, D0_G, CK+, and CK−. This arrangement of contacts is specified by the HDMI specification.

FIG. 2C shows a side view of the HDMI receptacle. The leads are part of conductive paths from a contact 204 on one end to a pin 206 on the other end. The conductive paths are shown as a single element in FIG. 2C for purposes of clarity. In different embodiments, the conductive path from contact 204 to pin 206 may include more than one element. The contacts 204 are located in the housing 202. The leads extend to pins 206 that can be surface mounted to a printed circuit board. The leads extending from the top row of contacts to the left column of pins are D1_G and CK_G. The leads extending from the top row of contacts to the right column of pins are D2+, D2−, D0+, and D0−. The leads extending from the bottom row of contacts to the left column of pins are D1+, D1−, CK+, and CK−. The leads extending from the bottom row of contacts to the right column of pins are D2_G and D0_G.

Figure 3:
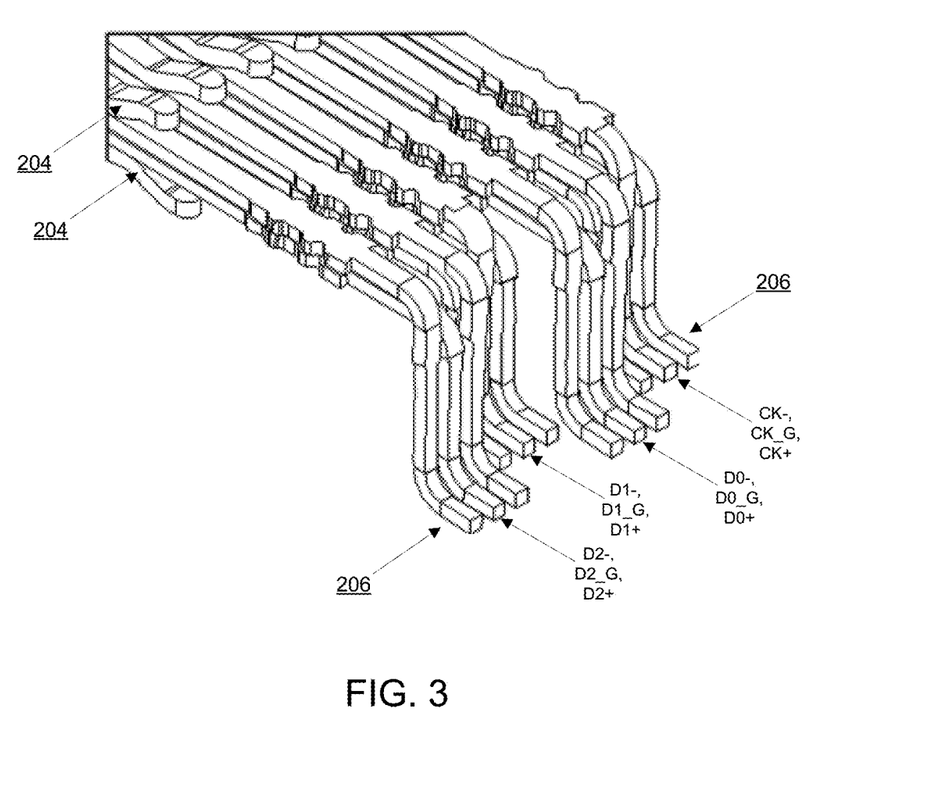
FIG. 3 is a perspective view of the leads from the HDMI connector of FIG. 2.

FIG. 3 is a perspective view of the leads from the HDMI connector of FIG. 2. The leads are bent into three sections. The first horizontal section is connected to the contact 204. The last horizontal section is the pin 206 that attaches to the surface mounting pad on a printed circuit board. The middle vertical section connects the first and the last sections. In the example shown in FIG. 3, the pins 206 are arranged in two columns.

Each channel has three pins 206. The pins 206 are arranged in groups of three, so that the pins from each channel are grouped together in the same column and the pins from an adjacent channel are in a different column. For example, the pins for channel D2 are all in the right column, and the pins for adjacent channel D1 are then in the left column. In this way, crosstalk between adjacent channels is reduced due to the physical separation. This is also true for the lead shapes. For example, the lead for D1+ is next to the lead for D0−, but because of their contact locations (top row vs bottom row) and pin locations (right column vs left column), the two leads are separated from each other for all three sections.

Figure 4A:
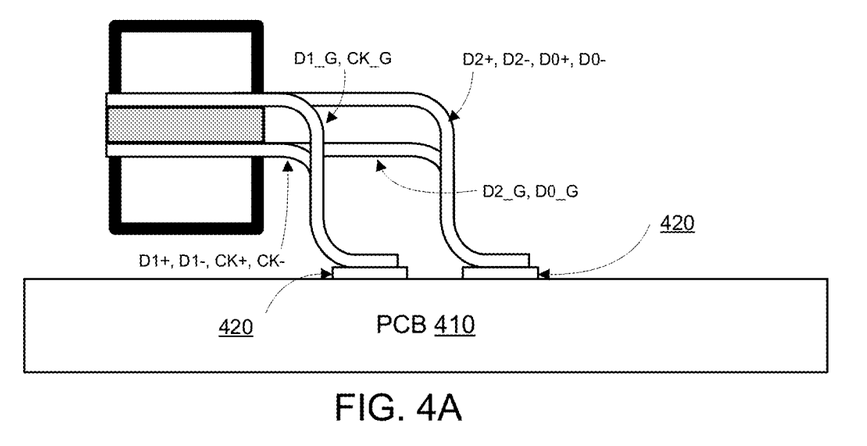
FIG. 4A is a side view of the HDMI connector of FIG. 2 surface mounted on a printed circuit board.

FIG. 4A is a side view of the HDMI connector of FIG. 2 surface mounted on a printed circuit board 410 via the pads 420. The pins of the connector are soldered to the pads 420. In this example, the HDMI connector is one of the components mounted on the printed circuit board 410, which may be part of an HDMI source device or part of an HDMI sink device.

Figure 4B:
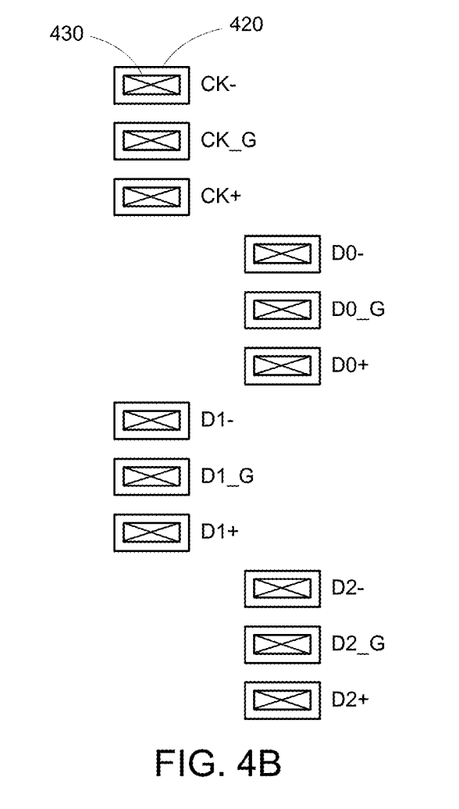
FIG. 4B is a top view of the pad pattern used in FIG. 4A.

FIG. 4B is a top view of the pattern of pads 420 in FIG. 4A. In FIG. 4A, the outer rectangle is the pad 420. The area where the pin contacts a pad will be referred to as the contact point 430, which is indicated by the crossed rectangle. The pad 420 and contact point 430 are marked by reference numerals only for one pin in FIG. 4B. In some embodiments, the area of a contact point may be smaller than the corresponding pad. In other embodiments, a contact point may have essentially the same area as the corresponding pad.

The pads in this example are arranged in two columns. The left column includes the pads for CK−, CK_G, CK+, D1−, D1_G, and D1+ corresponding to the clock channel and data channel 1. The right column includes the pads for D0−, D0_G, D0+, D2−, D2_G, and D2+ corresponding to data channels 0 and 2. From top to bottom, the pads corresponding to the pins shown in FIG. 4B are in a same order as the leads shown in FIG. 2A. In the pad pattern shown in FIG. 4B, for each of the four channels, the pads for that channel are all in a same column. For the data channel 2, the pads for D2−, D2_G, and D2+ are all in the right column. For the data channel 1, the pads for D1−, D1_G, and D1+ are all in the left column. For the data channel 0, the pads for D0−, D0_G, and D0+ are all in the right column. For the clock channel, the pads for CK−, CK_G, and CK+ are all in the left column.

In existing HDMI connectors, the pads are usually arranged in one column and placed at equal intervals. In such an arrangement, there is no ground line or shielding between adjacent channels in those connectors. Rather, the neighboring lines of adjacent channels are next to each other. For example, D2− would be next to D1+. This results in higher crosstalk between these lines, which limits the data transmission rate.

By arranging the pads in two columns as shown in FIG. 4B, the distances between neighboring lines of the adjacent channels is increased. For example, the distance between the D2− and D1+ pads is significantly increased compared to a pattern where all pads are arranged in one column. The increased distances reduce the crosstalk between the neighboring lines. This arrangement also increases distances between the rest of the lead, as shown and discussed with respect to FIG. 3. The reduced crosstalk supports higher data rates where conventional pad/pin patterns could not.

Figure 5A:
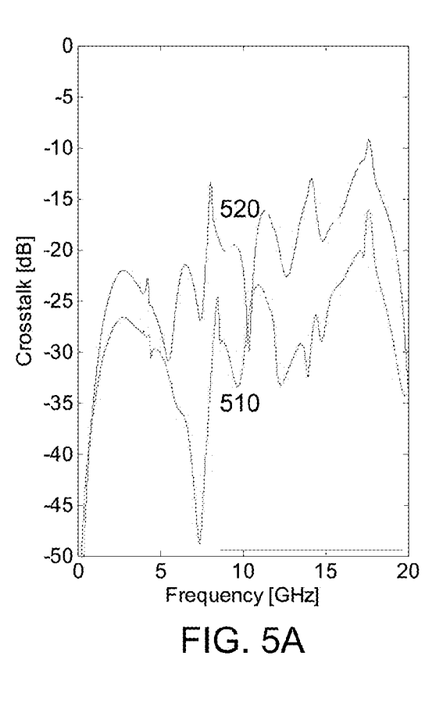
FIGS. 5A-5C are graphs of channel to channel crosstalk as a function of frequency, comparing a new HDMI connector design against a conventional HDMI connector design.
Figure 5B:
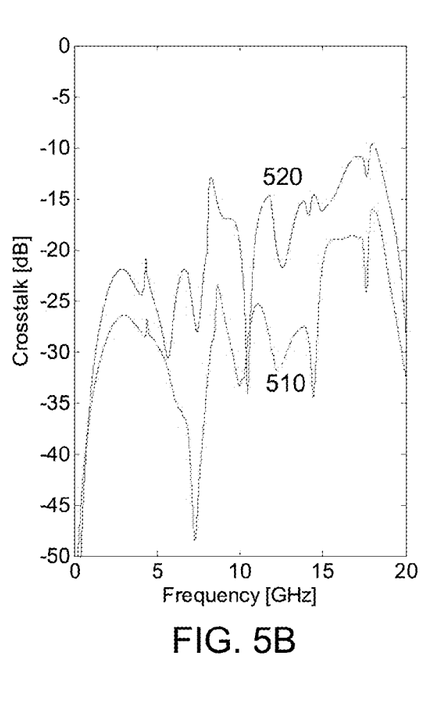
Figure 5C:
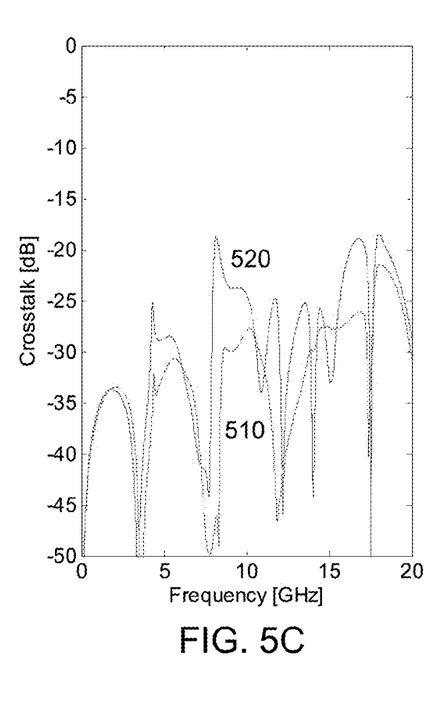

FIGS. 5A-C are graphs of channel to channel crosstalk for different pad patterns. FIG. 5A plots the crosstalk between data channels 1 and 2. FIG. 5B plots the crosstalk between data channels 1 and 0. FIG. 5C plots the crosstalk between data channel 1 and the clock channel. In each plot, curve 510 is the crosstalk using the pin and pad pattern shown in FIGS. 2-4. Curve 520 is the crosstalk using a convention pattern where all the pads are in a single column. In each of the three graphs, the two-column design has lower crosstalk than the conventional one-column design.

The design shown in FIGS. 2-4 is just one example. FIGS. 6A-6D show additional examples. Preferably, designs should have some or all of the following characteristics: The contacts on the connector should be arranged in the order dictated by the HDMI specification (e.g., see FIG. 2B). The pins preferably are in the same order as the contacts. The leads from contact to pin preferably have a minimum number of bends. Pads for one channel preferably are separated or shielded from pads for other channels. In addition, pads for each differential pair preferably are closer to the pad for the corresponding dedicated ground, than to differential pairs from other channels (e.g., D0+ is closer to D0_G than to D1−). In some cases, the dedicated ground may be the closest pad to the pad for a differential pair (e.g., D2− is closer to D2_G than to any other pad).

Figure 6A:
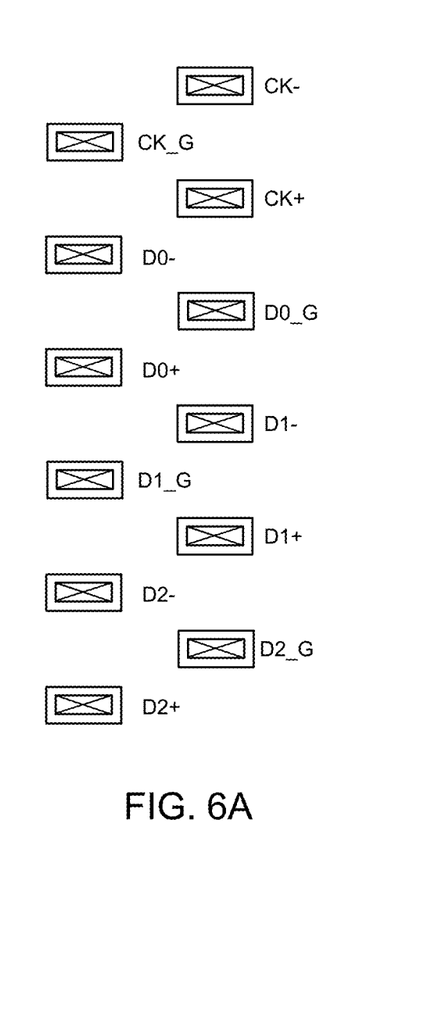
FIGS. 6A-6D show the pad patterns for additional embodiments according to the present invention.

FIG. 6A shows a pad pattern with two columns. The left column are the pads corresponding to the top row of the contacts shown in FIG. 2B, and the right column are the pads corresponding to the bottom row of the contacts shown in FIG. 2B. The four dedicated ground pins (CK_G, D0_G, D1_G, and D2_G) are attached to the pads that are in a different column with their respective signal pair. For example, for the data channel 0, the dedicated ground pin D0_G is attached to the pad in the right column, while the signal pair (D0−/D0+) is attached to the pads in the left column. This is true also for the data channel 2. For the clock channel and the data channel 1, the opposite is true; i.e., the dedicated ground pins (CK_G and D1_G) are attached to the pads in the left column, while the signal pair pins (CK−/CK+ and D1−/D1+) are attached to the pads in the right column.

Figure 6B:
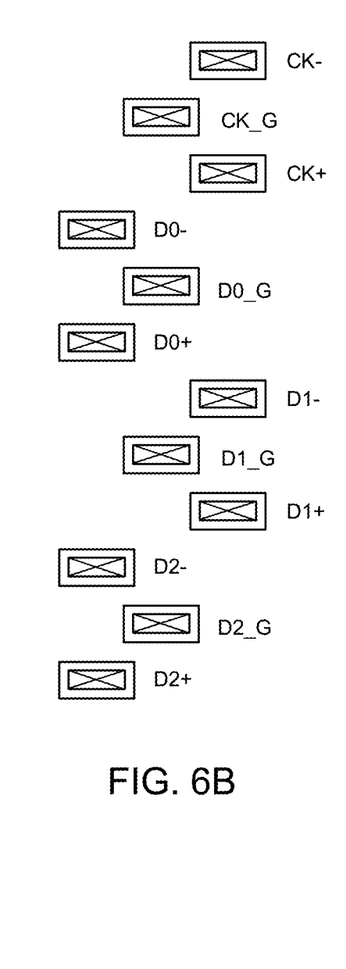

FIG. 6B shows another pad pattern with three columns, instead of two. In this pad pattern, the four ground pins are attached to the middle column of pads, i.e., CK_G, D0_G, D1_G, and D2_G. Other pins are attached to the same pads as in FIG. 6A. By arranging the ground pins in a separate column, the distances between the ground pins and the signal pair pins of different channels are increased. For example, in FIG. 6B, the distance between the pins CK_G and D0− is increased comparing with FIG. 6A. Also the distances between the pins D0_G and D1− and between the pins D1_G and D2− are increased.

Figure 6C:
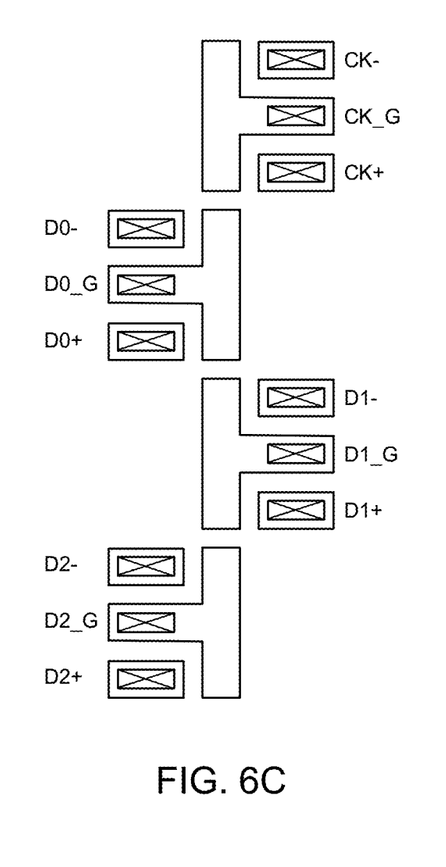
Figure 6D:
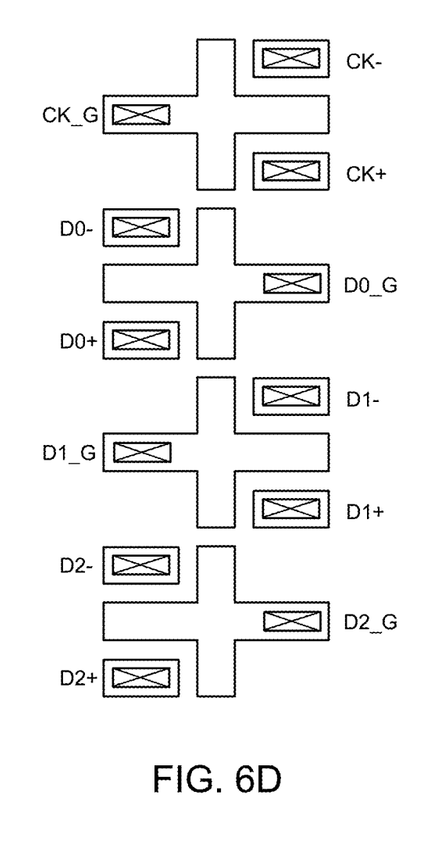

In the examples above, the sizes and shapes of the pads are all the same, but this is not required. FIG. 6C shows a pad pattern where the pads are two different sizes and shapes. The ground pads are larger and shaped to provide some shielding between adjacent channels. FIG. 6D shows another pad pattern where the pads are different sizes and shapes.

The data transmission performance of HDMI connectors depends on various factors, in addition to the crosstalk reduction achieved. For example, impedance matching and/or other types of impedance control may be considered during design. In one embodiment, the connectors are designed so that the three data channels and the clock channel are sufficiently non-interfering such that the HDMI connector can support data transmission of at least 6 Gbps per channel. In another embodiment, the three data channels and the clock channel are sufficiently non-interfering such that the HDMI connector can support data transmission of at least 9 Gbps per channel or even 12 Gbps per channel.

Various embodiments of the present invention have been shown as an HDMI Type A receptacle for illustration purposes only. Other embodiments of the present invention may take different forms. For connectors implemented as an HDMI plug according to the invention, the principles demonstrated by the embodiments implemented as HDMI receptacles can be applied accordingly as well. In addition, an HDMI connector according to the present invention may also include a printed circuit board that contains the surface mounting pads to which the pins attach. Such an HDMI connector may be part of a larger device that includes the printed circuit board. HDMI connectors other than Type A connectors may also be used.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An HDMI connector comprising a plurality of separate conductive paths, each conductive path having a contact on one end and a pin on an opposite end, the contacts arranged in a top row and a bottom row according to an HDMI specification and adapted to make electrical connection to counterpart contacts on a counterpart HDMI connector, the pins arranged to attach to corresponding surface mounting pads in two columns of contact points, wherein the plurality of separate conductive paths includes four channels of three conductive paths each, the three conductive paths within each channel correspond to a differential pair and a dedicated ground; and wherein for each of the four channels, all contact points for that channel are in a same column.

2. The HDMI connector of claim 1 wherein each conductive path includes a lead bent into three sections: a first section connected to the contact, a last section suitable to attach to the surface mounting pad, and a middle section connecting the first and last sections.

3. The HDMI connector of claim 1 wherein the HDMI connector is a receptacle type connector.

4. The HDMI connector of claim 1 wherein the HDMI connector is a Type A receptacle.

5. The HDMI connector of claim 1 wherein the HDMI connector is a plug type connector.

6. The HDMI connector of claim 1 further comprising a printed circuit board containing the surface mounting pads.

7. The HDMI connector of claim 6 wherein the pins are soldered to the surface mounting pads.

8. The HDMI connector of claim 1 wherein the four channels correspond to a D0 differential data signal, a D1 differential data signal, a D2 differential data signal and a CK differential clock signal.

9. The HDMI connector of claim 8 wherein the four channels are sufficiently non-interfering to support data transmission of at least 6 Gbps per channel.

10. The HDMI connector of claim 8 wherein the four channels are sufficiently non-interfering to support data transmission of at least 9 Gbps per channel.

11. The HDMI connector of claim 8 wherein the HDMI connector is compliant with an HDMI specification that requires data transmission of at least 6 Gbps per channel and is also backwards compatible with HDMI specification v 1.4.

12. The HDMI connector of claim 8 wherein, for each of the four channels, the pad for each of the differential pair is closer to the pad for the dedicated ground than to any pad for any differential pair for a different channel.

13. The HDMI connector of claim 8 wherein the pad for any of the differential pair of any channel is closer to the pad for the dedicated ground for that channel than to any other pad.

14. The HDMI connector of claim 8 wherein the contact points for the pins occur in a same order as the contacts.

15. The HDMI connector of claim 8 wherein the contact points corresponding to the contacts in the top row are all in one column, and the contact points corresponding to the contacts in the bottom row are all in another column.

16. The HDMI connector of claim 8 wherein the pads are all a same size and shape.

17. The HDMI connector of claim 8 wherein the pads are at least two different sizes or shapes.

18. The HDMI connector of claim 8 wherein for each of the four channels, all conductive paths have a same cross-section.

19. The HDMI connector of claim 8 wherein the pads for the dedicated grounds are larger than the pads for the differential pairs.

20. The HDMI connector of claim 19 wherein the pads for the dedicated grounds provide shielding between differential pairs of different channels.

\* \* \* \* \*